April 4, 1950 L. A. CLEAVELAND ET AL 2,502,824

SIGNALING DEVICE FOR SOUND POWERED TELEPHONE SYSTEMS

Filed Oct. 15, 1947 2 Sheets-Sheet 1

INVENTORS
Leroy A. Cleaveland and
Frank A. Tooker
BY
Watson, Cole, Grindle & Watson
ATTORNEYS

SIGNALING DEVICE FOR SOUND POWERED TELEPHONE SYSTEMS

Filed Oct. 15, 1947 2 Sheets-Sheet 2

INVENTORS
Leroy A. Cleaveland and
Frank H. Tooker
BY
Watson, Cole, Grindle & Watson
ATTORNEYS Patented Apr. 4, 1950 2,502,824

UNITED STATES PATENT OFFICE 2,502,824

SIGNALING DEVICE FOR SOUND POWERED TELEPHONE SYSTEMS

Le Roy A. Cleaveland, Mountainside, and Frank H. Tooker, West Orange, N. J., assignors to United States Instrument Corporation, Summit, N. J., a corporation of New Jersey Application October 15, 1947, Serial No. 780,016

5 Claims. (Cl. 179—1)

Figure 1:
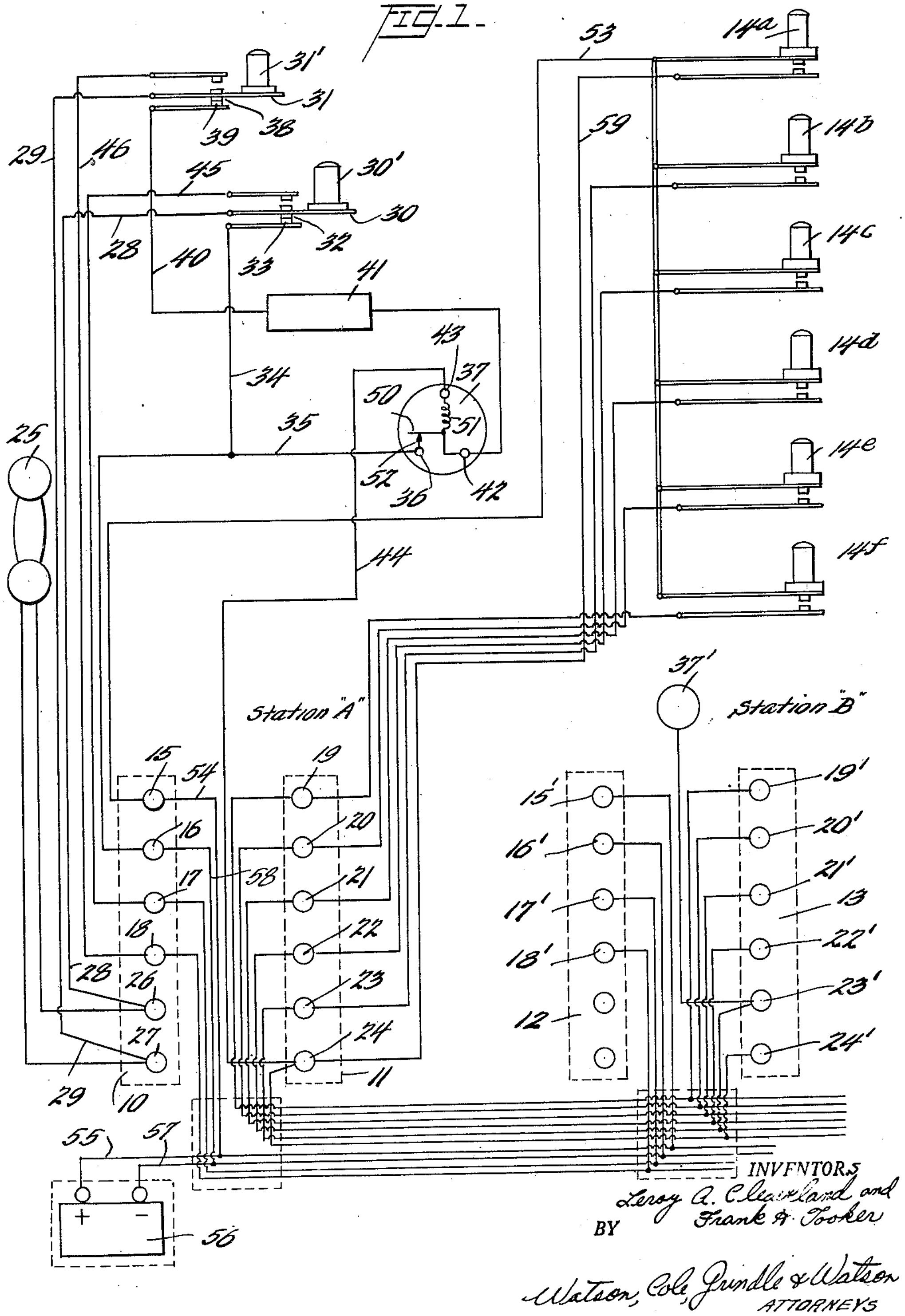

This invention relates to telephone systems, and more particularly to systems of the so-called sound-powered type, in which no outside source of electric energy is employed in the speaking circuit, the speech-carrying current being generated from the sound waves created by the speaker's voice. Such systems may employ, for signalling purposes, small signal generators which are manually operated, the telephone instrument at the receiving station being employed as the instrument for giving off the audible signal, or other signalling means may be used. The present invention relates particularly to a novel signalling system for use in such systems, employing a current interrupter at each station of the system which current interrupter draws energy from a direct current source of low power, such as a pair of dry cells, and furnishes a low-power interrupted current of audible frequency to the telephone instrument at the said station, which gives off an audible signal indicating that the said station is being called. Preferably, but not necessarily, the current interrupter employed is of the type described and claimed in co-pending application Serial No. 714,280, filed December 5, 1946, by L. A. Cleaveland and L. G. Barylewicz, now abandoned.

As mentioned above, the sound-powered telephone instrument operates, for conversational purposes, without connection to any external source of electric power, small electric currents being generated in the telephone instrument by conversion of the sound waves striking the diaphragm. Thus, each telephone instrument operates continuously, converting any sound within the range of the instrument into tiny electrical currents. If these small currents from several stations in a system are allowed to reach an instrument which is in use, they will produce an objectionable background noise thus interfering with the conversation of the user. When sound-powered units, either receiver or transmitter, in the telephone instrument are also used as howlers or audible signals for calling purposes they must at all times be connected to the incoming call lines when the instrument is in the cradle. Therefore, the sound-powered instrument resting in the cradle will pick up any sound, whether it be speech or other noise, and transmit it over the system unless a circuit is provided which will prevent such transmission either by short-circuiting or opening the circuit between the instrument and the calling lines. If such a circuit is not provided, the instrument at any particular station will not provide privacy for the operator or user at such station, and may not be acceptable for that reason.

Accordingly, it is the general object of the present invention to provide, in a telephone system of the sound-powered type, a plurality of telephone instruments at separated stations, means for interconnecting said stations for calling and speaking, a normally open speaking circuit connecting the several instruments of the system, a normally closed calling circuit connecting said instruments, and a current interrupter at each station which current interrupter provides a short-circuit path for currents generated in the adjacent telephone instrument, whereby said currents are isolated from the rest of the system, and at the same time provides means for supplying an interrupted current of audible frequency to the said instrument, when the interrupter is energized for the purpose of calling the said station.

Figure 2:
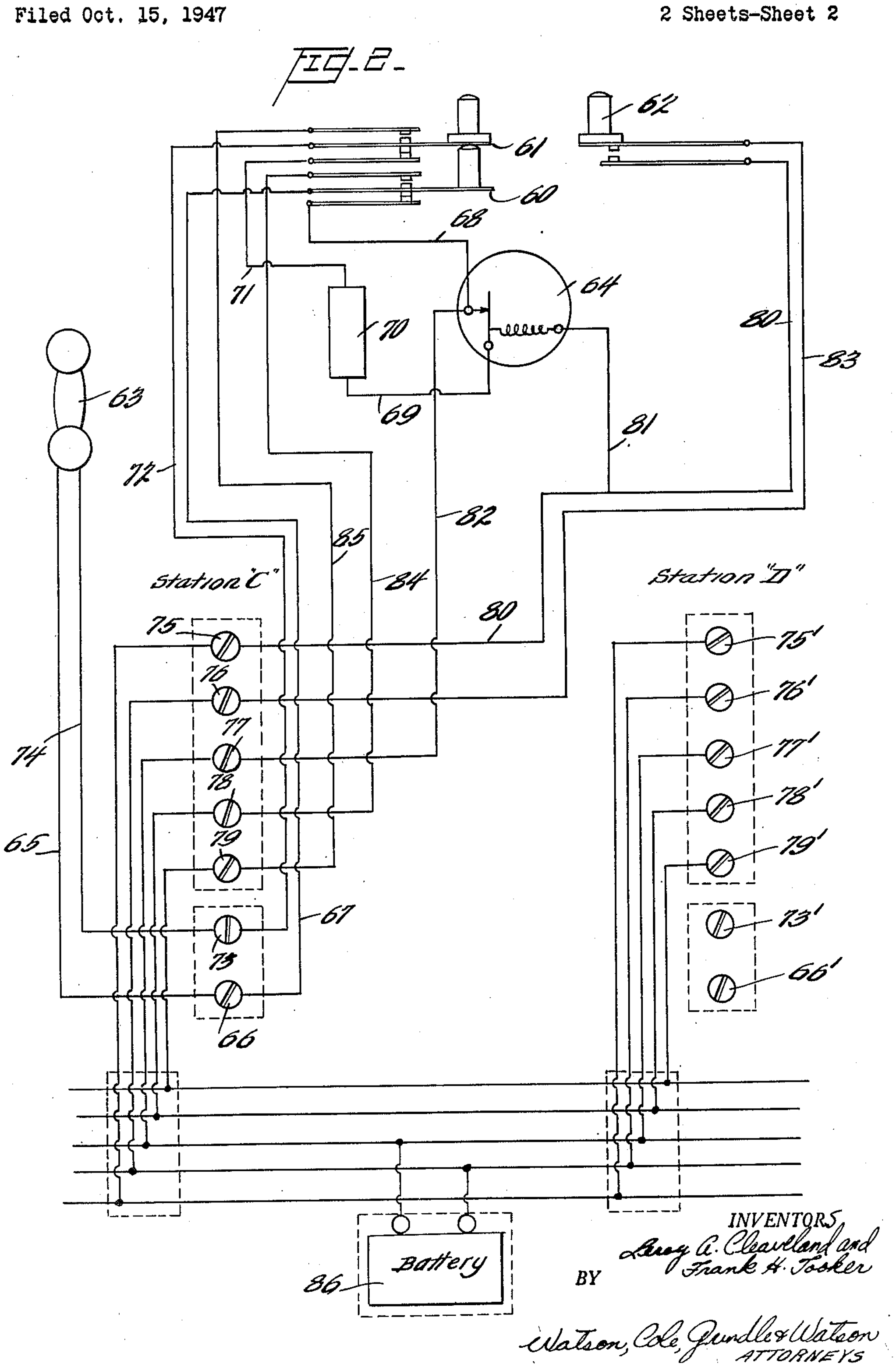

Other and further objects, features and advantages will be apparent from the description which follows, read in connection with the accompanying drawings in which Figure 1 illustrates a portion of a common talking, selective ringing telephone system of the sound-powered type, employing the present invention; and Figure 2 illustrates a portion of a common talking, code ringing sound-powered telephone system employing the present invention.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Figure 1 illustrates the connections between two stations of a common talking, selective ringing system, and the local connections at one of said stations. Thus, the terminal blocks 10 and 11 at the left-hand side of the figure are located at station A while the terminal blocks 12 and 13 at the right-hand side are located at station B. The terminal block 10 accommodates connections between the local calling and speaking circuits and the remainder of the system, while the terminal block 11 accommodates connections between the selective ringing buttons or switches 14a, 14b, etc. and the other stations of the system. Terminals 15, 16, 17 and 18 of terminal block 10 are connected to like terminals 15', 16'

17′ and 18′ of terminal block 12, while terminals 19, 20, 21, 22, 23 and 24 of terminal block 11 are similarly connected to like terminals 19′, 20′, 21′, 22′, 23′ and 24′ of terminal block 13. The telephone instrument 25 is connected through terminals 26 and 27 of the terminal block 10 to conductors 28 and 29, respectively, which extend to cradle switches 30 and 31, respectively. It will be understood that the switches 30 and 31 are positioned in the crade of the telephone instrument and are normally depressed by the weight of the instrument. The conductor 28 is normally connected through the contact pair 32, 33 to conductor 34 which is tapped into conductor 35 extending from the terminal 16 to terminal 36 of the current interrupter 37. Conductor 29 is normally connected through contact pair 38, 39 to conductor 40 which is connected through a condenser or resistor 41 to terminal 42 of the current interrupter 37. The terminal 43 of the current interrupter is connected through conductor 44 with terminal 24 of terminal block 11. When the buttons 30′, 31′ of the cradle switches 30, 31 are in upper position, as when the telephone instrument is lifted from its cradle, the conductors 28 and 29 are connected through conductors 45 and 46 with the terminals 17 and 18 of terminal block 10, and thus with the common speaking circuit.

The current interrupter 37, which is shown diagrammatically, comprises an armature 50 and coil 51, the armature normally resting against the contact member 52 which is electrically connected with the terminal 36, the opposite end of the armature being electrically connected to the terminal 42. Thus, when the instrument 25 is in its cradle, it is connected in a closed circuit comprising conductors 28, 29, 35 and 40, and armature 50 of the current interrupter. Thus any currents generated in the instrument 25 due to noises occurring nearby are not conducted to the common conductors connecting the several stations, and such noises or speech cannot be heard at the other stations either through the calling or speaking circuits.

However, when button 14*a*, a replica of which is present at each station, is depressed, a circuit is closed through conductor 53, terminal 15, conductors 54 and 55, battery 56, conductors 57 and 58, terminal 16, conductors 35, armature 50 of the current interrupter, coil 51, with which the armature 50 is electrically connected, conductor 44, terminal 24 and conductor 59, thus energizing the coil 51 and causing the armature 50 to vibrate at an audible frequency in the well-known manner of current interrupters. Such actuation of the current interrupter 37 causes an interrupted current of audible frequency to flow through the telephone instrument 25, causing the sound-powered units therein to give off an audible calling signal. Should the instrument then be lifted from the cradle, the speaking circuit will then be established with the calling station as described above.

The resistor or condenser 41 in circuit with the telephone instrument 25 and current interrupter 37, serves two functions. When the interrupter is used with a telephone instrument of relatively low direct-current resistance, the resistor or condenser in series with the instrument prevents the latter from forming a low resistance shunt across the interrupter contacts. Also, the resistor or condenser serves to limit or control the current flow through the receiver and transmitter instruments in the telephone when the current interrupter is energized. If the direct-current resistance of the telephone instrument is sufficiently high to safely consume the full ringing power from the current interrupter, the resistor or condenser 41 may be omitted.

The local connections at each station are the same as those illustrated in connection with station A, except that the current interrupter is connected to a different terminal of the right-hand terminal block at each station. Thus, the current interrupter 37′ at station B is connected to terminal 23′ rather than terminal 24′, which corresponds to terminal 24 at station A. At the next station (station C) the current interrupter would be connected to the terminal corresponding to terminal 22 at station A, etc. Thus any station on the system may be called by depressing the appropriate button 14*a*—14*f* at the calling station.

Referring now to Figure 2, which illustrates a common talking, code ringing system, the cradle switches are seen at 60 and 61, the bank of ringing buttons of the selective ringing system being replaced by a single ringing button 62. The telephone instrument 63 is connected through the switches 60 and 61 and current interrupter 64 in the same manner as in Figure 1, employing conductor 65, terminal 66, conductors 67, 68 and 69, resistor or condenser 70, conductors 71, and 72, terminal 73 and conductor 74. Terminals 75, 76, 77, 78 and 79 at station A are connected to like terminals 75′, 76′, 77′, 78′ and 79′ of station D and the other stations of the system. The calling circuit through the current interrupter 64 comprises conductors 80, 81 and 82, while the ringing circuit through the ringing button switch 62 comprises conductors 80 and 83. The speaking circuit through the telephone instrument and the upper contact pairs of cradle switches 60 and 61 comprise conductors 65, 67 and 84 to terminal 78 and conductors 74, 72 and 85 to terminal 79. Local connections are the same at all stations, and the battery 86 is connected to terminals 76 and 77 of station C and the corresponding terminals of each other station. In this system, the telephone instrument at each station will emit an audible signal whenever any ringing button 62 is depressed, the caller employing a pre-arranged code to designate which station is being called. The function of the current interrupter 64 is precisely the same as that of current interrupter 37 of Figure 1.

Having thus described the invention, what is claimed as new and desired to be secured by Letters Patent is:

1. In a sound-powered telephone system comprising a plurality of telephones at separated stations, means for interconnecting said stations for calling and speaking, said means including a speaking circuit, normally open contact means at each station for connecting the telephone at said station into said speaking circuit, normally closed contact means at each station connecting said telephone into said calling circuit, and a current interrupter at each station and connected into said calling circuit, said current interrupter being adapted to supply a low-power interrupted current to said telephone when energized and forming a closed circuit with said telephone when not energized, an energy source for said current interrupters, each said current interrupter comprising an armature shunted across its associated telephone and connected with one pole of said energy source, and a coil connected between said shunt circuit and the other pole of said energy source, and means at each station for connecting said current interrupters to said energy source.

2. A telephone system according to claim 1, said last means comprising a pair of normally open contacts in circuit with all of said current interrupters and with said energy source.

3. A telephone system according to claim 1, said last means comprising a plurality of pairs of normally open contacts, each said pair being in circuit with one of said current interrupters and with said energy source.

4. A telephone system according to claim 1, each said current interrupter serving to isolate the telephone at its respective station from said calling circuit when said interrupter is not energized.

5. A sound-powered telephone system comprising a plurality of telephones at separated stations, conductors connecting said stations and comprising normally open calling and speaking circuits, a current interrupter at each station and comprising an armature and a coil in series with said calling circuit, means connecting said telephone at said station across said armature to form a closed circuit therewith when said coil is deenergized and connecting said telephone into said calling circuit when said coil is energized, an energy source in said calling circuit, and means at each station for closing said calling circuit.

LE ROY A. CLEAVELAND.
FRANK H. TOOKER.

REFERENCES CITED

The following references are of record in the file of this patent:

UNITED STATES PATENTS

| Number | Name | Date |
|---|---|---|
| 2,052,147 | Mullio | Aug. 25, 1937 |
| 2,162,370 | Campbell | June 13, 1939 |
| 2,275,406 | Berkley | Mar. 10, 1942 |